(12) United States Patent
Bhat

(10) Patent No.: US 9,754,228 B2
(45) Date of Patent: Sep. 5, 2017

(54) INTEGRATING SOFTWARE SOLUTIONS TO EXECUTE BUSINESS APPLICATIONS

(71) Applicant: Raveeshkumar Bhat, Bangalore (IN)

(72) Inventor: Raveeshkumar Bhat, Bangalore (IN)

(73) Assignee: SAP SE, Walldorf (DE)

( * ) Notice: Subject to any disclaimer, the term of this patent is extended or adjusted under 35 U.S.C. 154(b) by 141 days.

(21) Appl. No.: 14/306,246

(22) Filed: Jun. 17, 2014

(65) Prior Publication Data
US 2015/0363228 A1    Dec. 17, 2015

(51) Int. Cl.
| | | |
|---|---|---|
| G01M 1/38 | (2006.01) |
| G05B 13/00 | (2006.01) |
| G05B 15/00 | (2006.01) |
| G05D 23/00 | (2006.01) |
| G06Q 10/06 | (2012.01) |
| G06Q 10/10 | (2012.01) |

(52) U.S. Cl.
CPC ........... *G06Q 10/06* (2013.01); *G06Q 10/101* (2013.01)

(58) Field of Classification Search
None
See application file for complete search history.

(56) References Cited

U.S. PATENT DOCUMENTS

| | | | | |
|---|---|---|---|---|
| 8,291,214 B2* | 10/2012 | Helfman | ............... | H04L 63/104 |
| | | | | 713/153 |
| 2011/0231899 A1* | 9/2011 | Pulier | ................. | G06F 9/45558 |
| | | | | 726/1 |
| 2012/0131101 A1* | 5/2012 | Said | ...................... | G06F 9/5072 |
| | | | | 709/204 |
| 2013/0139164 A1* | 5/2013 | Balko | ....................... | G06F 8/35 |
| | | | | 718/102 |
| 2014/0033200 A1* | 1/2014 | Tompkins | ............. | H04L 63/061 |
| | | | | 718/1 |
| 2014/0173607 A1* | 6/2014 | Daeschle | ............... | G06Q 10/04 |
| | | | | 718/102 |
| 2015/0120701 A1* | 4/2015 | Schmidt | ........... | G06F 17/30424 |
| | | | | 707/722 |
| 2015/0161547 A1* | 6/2015 | Aggarwal | ........ | G06Q 10/06316 |
| | | | | 705/7.26 |

(Continued)

OTHER PUBLICATIONS

Murugan, Study of Compute Application Resources Sharing for Android with Cloud Computing, IJIRCCE, Jan. 2014, vol. 2, Issue 1, pp. 2823-2827.*

(Continued)

*Primary Examiner* — Diem Cao

(57) ABSTRACT

Various embodiments of systems and methods to integrate software solutions to execute business applications are described herein. A request is received at a first software solution to execute a business application. In one aspect, the request is forwarded to a second software solution when a resource required to execute the business application is associated with the second software solution. A response is received from the second software solution corresponding to the execution of the business application. In another aspect, the business application is executed at the first software solution when the resource required to execute the business application is associated with the first software solution. The response corresponding to the execution of the business application is rendered on a computer generated UI associated with the first software solution.

12 Claims, 7 Drawing Sheets

(56) References Cited

U.S. PATENT DOCUMENTS

2015/0281401 A1* 10/2015 Le .................... H04L 67/42
709/203

OTHER PUBLICATIONS

Evangelidis et al, Geospatial services in the Cloud, Elsevier, Feb. 2014, pp. 116-122.*
Liu et al, SaaS Integration for Software Cloud, IEEE, 2010, pp. 402-409.*
Radoslav Nikolov et al.; Hybrid Applications Operating Between On-Premise and Cloud Platforms; filed with the USPTO under U.S. Appl. No. 14/285,631 on May 23, 2014; pp. 34.

* cited by examiner

INTEGRATING SOFTWARE SOLUTIONS TO EXECUTE BUSINESS APPLICATIONS

BACKGROUND

A software solution may be an on-premise solution or an on-demand solution. On-premise solution is a model of software deployment that involves an enterprise to purchase hardware such as servers, to invest capital into software licenses, and to invest into dedicated staff for maintenance and support. On-premise solution is the traditional model of software deployment where enterprises deploy applications in-house, e.g., on the premises of the enterprise. The on-demand solution or software as a service (SaaS) or cloud computing is a software unit in which software and associated data pertaining to a business application are centrally stored on a remote facility such as a cloud. The cloud storage is a model of networked online storage where data is stored on multiple virtual servers.

However, there are advantages and disadvantages with both cloud and on-premise platforms. Issues related to security and compliance of the on-demand solutions may be a disadvantage. On the other hand, for on-premise solutions, the cost may be a disadvantage. Therefore, organizations choose different business applications to be implemented and executed in different software solutions or a part of a business application in one software solution and other part of the business application to be executed in other software solution based on requirement of the business application, the pros and cons of the software solutions and sensitivity of data associated with the business application. For example, business applications implemented as an on-premise solution, such as a supplier lifecycle management (SLC), may require on-demand solution data. Therefore, there is an increasing demand for integrating software solutions.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques to integrate software solutions to execute business applications are described herein. According to an embodiment, a business application is accessed through any type of software solutions without any change in the business application. In other words, the business application is accessed via an on-premise solution or an on-demand solution. Further, the business application is executed using a required resource. The resource can be an on-premise server or a cloud server. Then, the response associated with the execution of the business application is communicated to a user. Thereby the user may not know on what software solution the business application is executed, but the user can access the business application through any of the software solutions.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
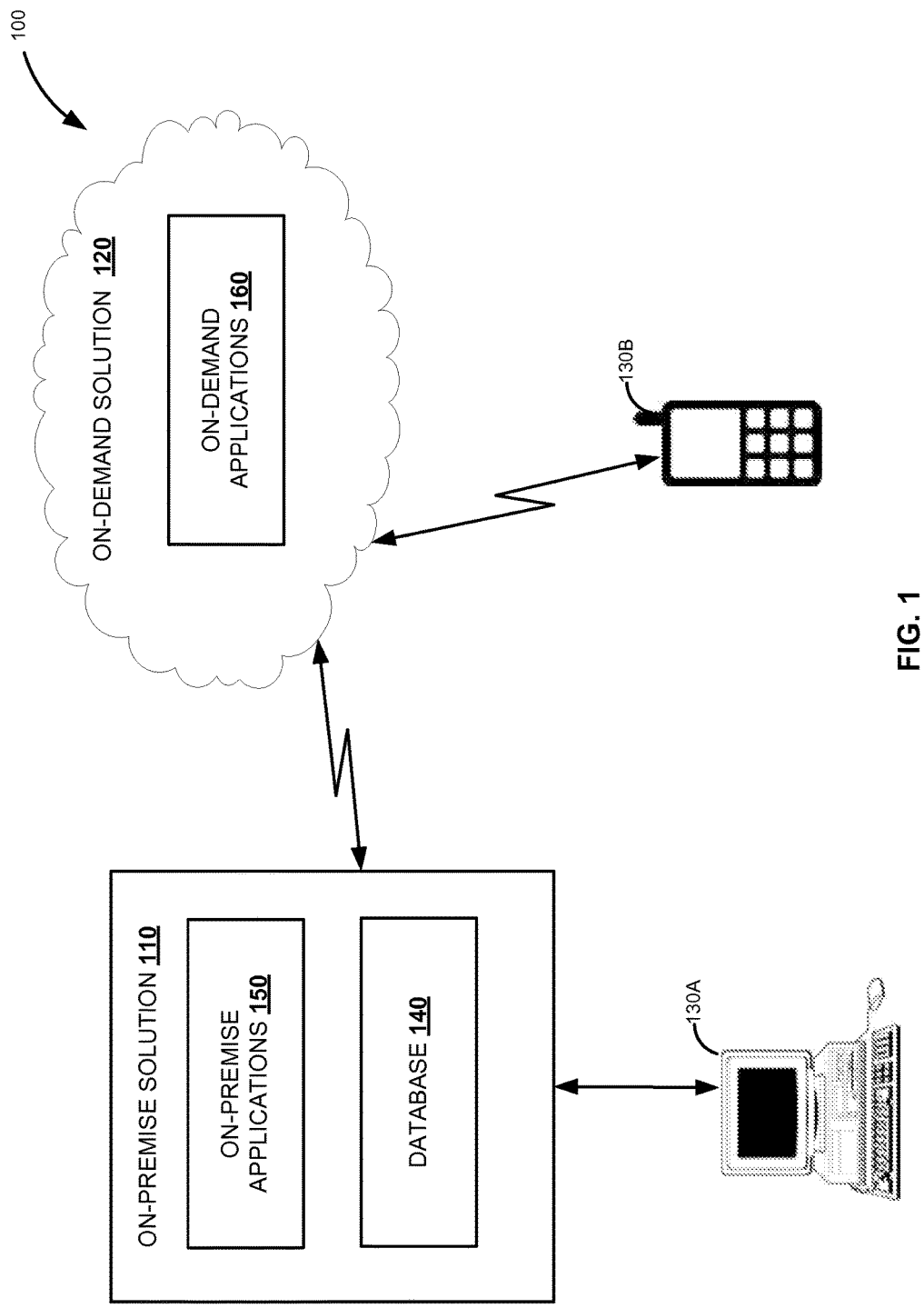
FIG. 1 illustrates a computing environment to enable execution of business applications using at least one of an on-premise solution and an on-demand solution, according to one embodiment.

FIG. 1 illustrates computing environment 100 to enable execution of business applications using at least one of on-premise solution 110 and on-demand solution 120, according to one embodiment. Organizations may choose to execute a business application completely on the on-premise solution 110 or on the on-demand solution 120. Also, the organizations may choose to execute a part of the business application using a resource of the on-premise solution 110 and other part of the business application using a resource of the on-demand solution 120. In one embodiment, a user (e.g., 130A and 130B) can access the business application via the on-premise solution 110 and also via the on-demand solution 120.

Business applications may be deployed on both the on-premise solution 110 and the on-demand solution 120 without modifying the business applications (e.g., without modifying original source code of the business application). For example, a business application may be deployed and/or run on the on-premise solution 110 (e.g., time and payroll information), and consume services or other resources provided by the on-demand solution 120 (e.g., public or virtual private cloud). Further, the business application may be deployed and/or run on the on-demand solution 120 and consume resources of the on-premise solution 110 such as database 140.

The on-premise solution 110 is a computing platform that may be installed and operated on the premises of an enterprise (e.g., 130A). On-premise solution 110 may deploy on-premise applications 150, which are executed using the database 140. The on-demand solution 120 may deploy on-demand applications 160. The on-demand solution 120 may be viewed as containing both a physical layer and an abstraction layer. The physical layer may consist of the hardware resources to support the cloud services being provided, and may typically include a server, a storage unit, network components, and so on. The abstraction layer may include the software deployed across the physical layer, which manifests the essential functionalities provided by the on-demand applications 160. In various embodiments, the on-demand solution 120 may provide support for the application lifecycle process, for example, deployment, installation, provisioning and maintenance of applications. In one embodiment, the on-demand solution 120 may be a platform-as-a-service (PaaS) solution implemented in Java® technology. Example of such PaaS offering may be HANA® Cloud Platform provided by SAP AG Company.

In one embodiment, a connector establishes a secure communication channel over a network from the on-premise solution 110 to the on-demand solution 120. Once established, the secure communication channel may be used by the business applications to remotely communicate with systems and resources of the intranet of the on-premise solution 110. In one embodiment, the persistent channel may also be used for bidirectional communication and by multiple virtual connections. Applications and systems of the on-premise solution 110 may use the communication channel to consume resources and services of the on-demand solution 120. Thus, integration of two types of software solutions may be achieved.

Figure 2:
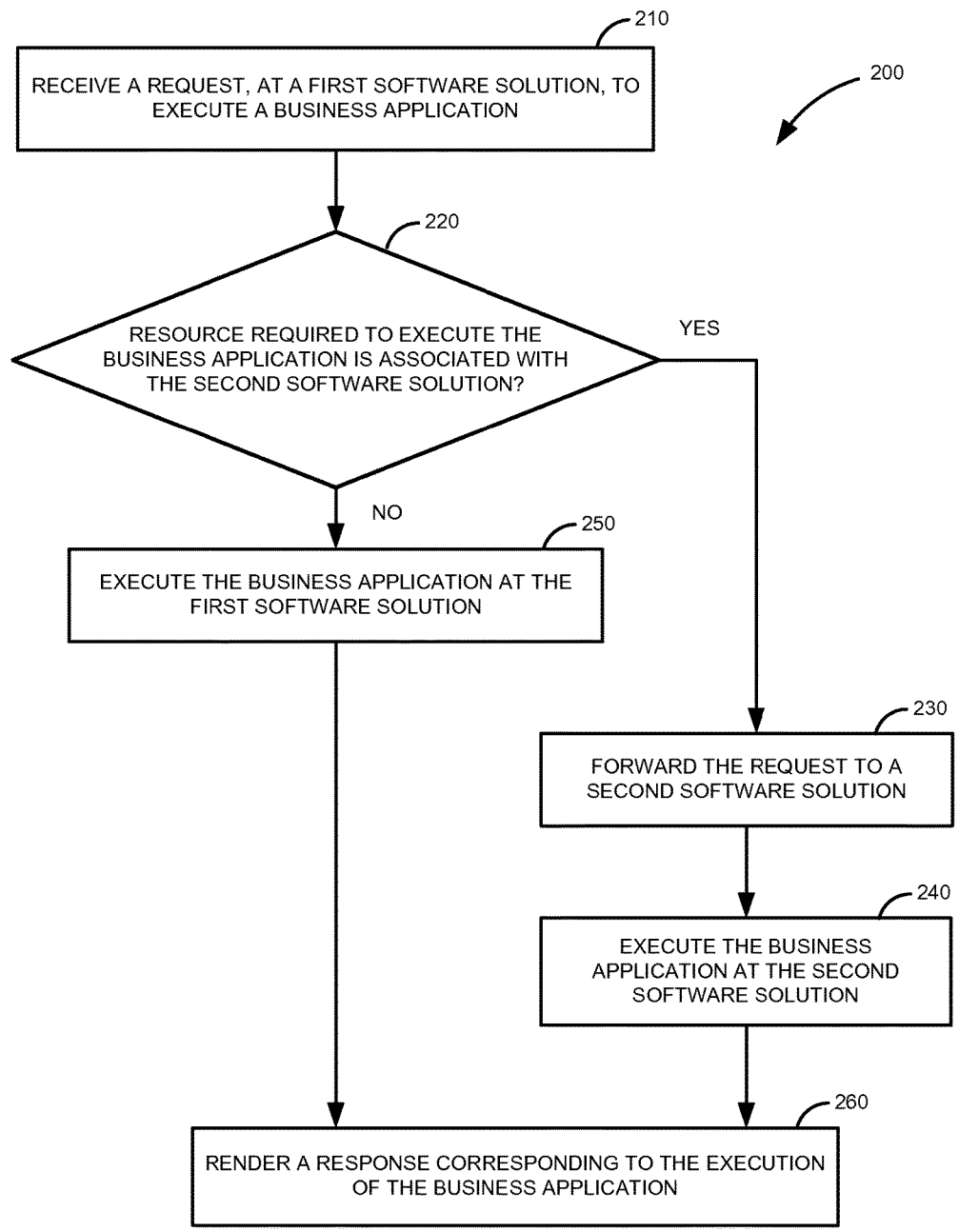
FIG. 2 is a flow diagram illustrating a process to integrate software solutions to execute business applications, according to an embodiment.

FIG. 2 is a flow diagram illustrating process 200 to integrate software solutions to execute business applications, according to an embodiment. At 210, a request is received at a first software solution to execute a business application. The business application includes at least one of an on-premise application and a cloud application. For example, the business applications can be enterprise resource planning (ERP), customer relationship management (CRM), supply chain management (SCM), supplier relationship management (SRM), and so on. Further, the first software solution can be an on-premise solution or an on-demand solution.

Upon receiving the request to execute the business application, the request is forwarded to a second software solution when a resource required to execute the business application is associated with the second software solution. At 220, a check is made to determine whether the resource required to execute the business application is associated with the second software solution. The resource can be an on-premise server or a cloud server. For example, if the business application is the on-premise application, the resource required to execute the business application is the on-premise server. If the business application is the on-demand application, the resource required to execute the business application is the cloud server.

At 230, the request is forwarded to the second software solution when the resource required to execute the business application is associated with the second software solution. In one embodiment, the request is forwarded to the second software solution via a secure communication channel between the first software solution and the second software solution by a dispatcher, where the dispatcher may act as a single point of access to the software solutions. The second software solution can be an on-premise solution or an on-demand solution. At 240, the business application is executed at the second software solution.

Further at 250, the business application is executed at the first software solution, when the resource required to execute the business application is associated with the first software solution. At 260, response corresponding to the execution of the business application is rendered on a computer generated graphical user interface associated with the first software solution. When the business application is executed in the second software solution, the response corresponding to the execution of the business application is sent to the first software solution via a secure communication channel.

Figure 3A:
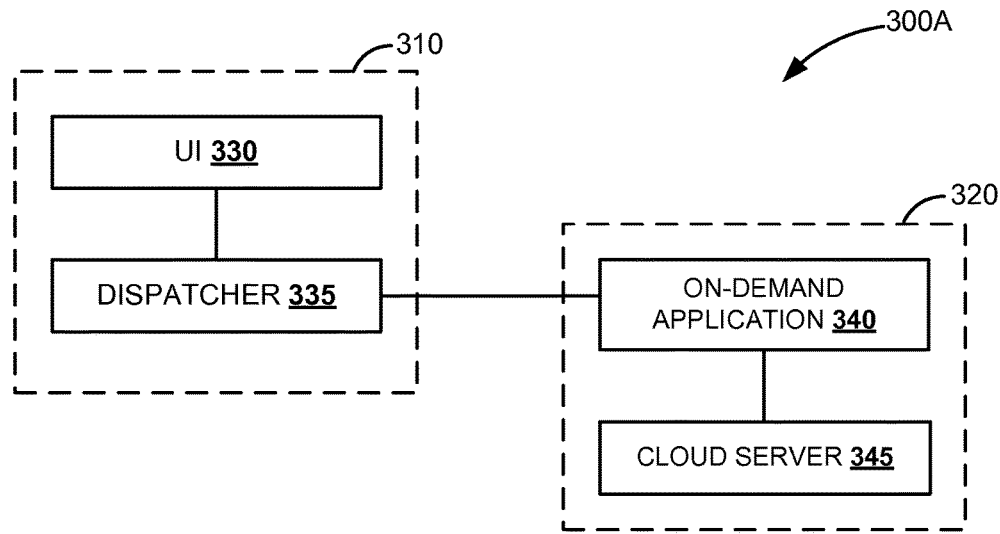
FIG. 3A is a block diagram illustrating a scenario of a process to integrate software solutions to execute business applications, according to an embodiment.

FIG. 3A is a block diagram illustrating a scenario of a process to integrate software solutions to execute business applications, according to an embodiment. In scenario 300A, a request is received at on-premise solution 310 to execute a business application via computer generated graphical user interface (UI) 330 of the on-premise solution 310. Further, a check is made, e.g., by dispatcher 335, to determine whether a resource required to execute the business application is associated with the on-premise solution 310. The resource associated with the on-premise solution can be an on-premise server. In one example, the resource required to execute the business application is not associated with the on-premise server. Therefore, the request is forwarded to on-demand solution 320. Further, the business application is executed using on-demand application 340 and cloud server 345. Then, the response corresponding to the execution of the business application is rendered on the computer generated graphical user interface (e.g., 330) associated with the on-premise solution 310. In another example, when the resource required to execute the business application is associated with the on-premise solution 310, the business application is executed on the on-premise solution 310 and the response corresponding to the execution of the business application is rendered on the computer generated graphical user interface (e.g., 330) associated with the on-premise solution 310.

Figure 3B:
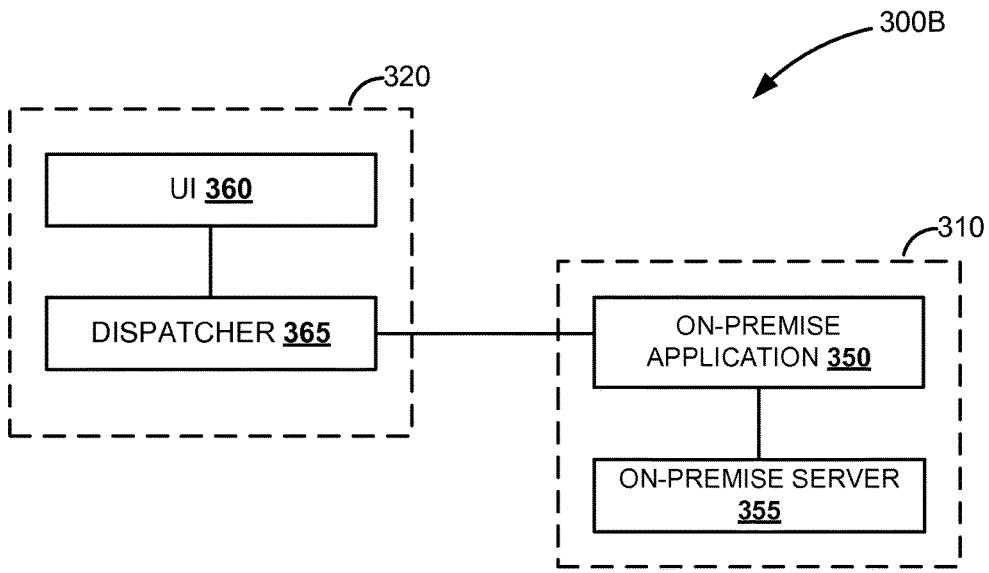
FIG. 3B is a block diagram illustrating a scenario of a process to integrate software solutions to execute business applications, according to an embodiment.

FIG. 3B is a block diagram illustrating a scenario of a process to integrate software solutions to execute business applications, according to an embodiment. In scenario 300B, a request is received at the on-demand solution 320 to execute a business application using computer generated graphical user interface (UI) 360 of the on-demand solution 320. Further, a check is made, e.g., by dispatcher 365, to determine whether a resource required to execute the business application is associated with the on-demand solution 320. The resource associated with the on-demand solution can be a cloud server. In the example, the resource required to execute the business application is not associated with the cloud server. Therefore, the request is forwarded to the on-premise solution 310. Further, the business application is executed using on-premise application 350 and on-premise server 355. Then, the response corresponding to the execution of the business application is rendered on the computer generated graphical user interface (e.g., 360) associated with the on-demand solution 320. In another example, when the resource required to execute the business application is associated with the on-demand solution 320, the business application is executed on the on-demand solution 320 and the response corresponding to the execution of the business application is rendered on the computer generated graphical user interface (e.g., 360) associated with the on-demand solution 320.

Figure 4:
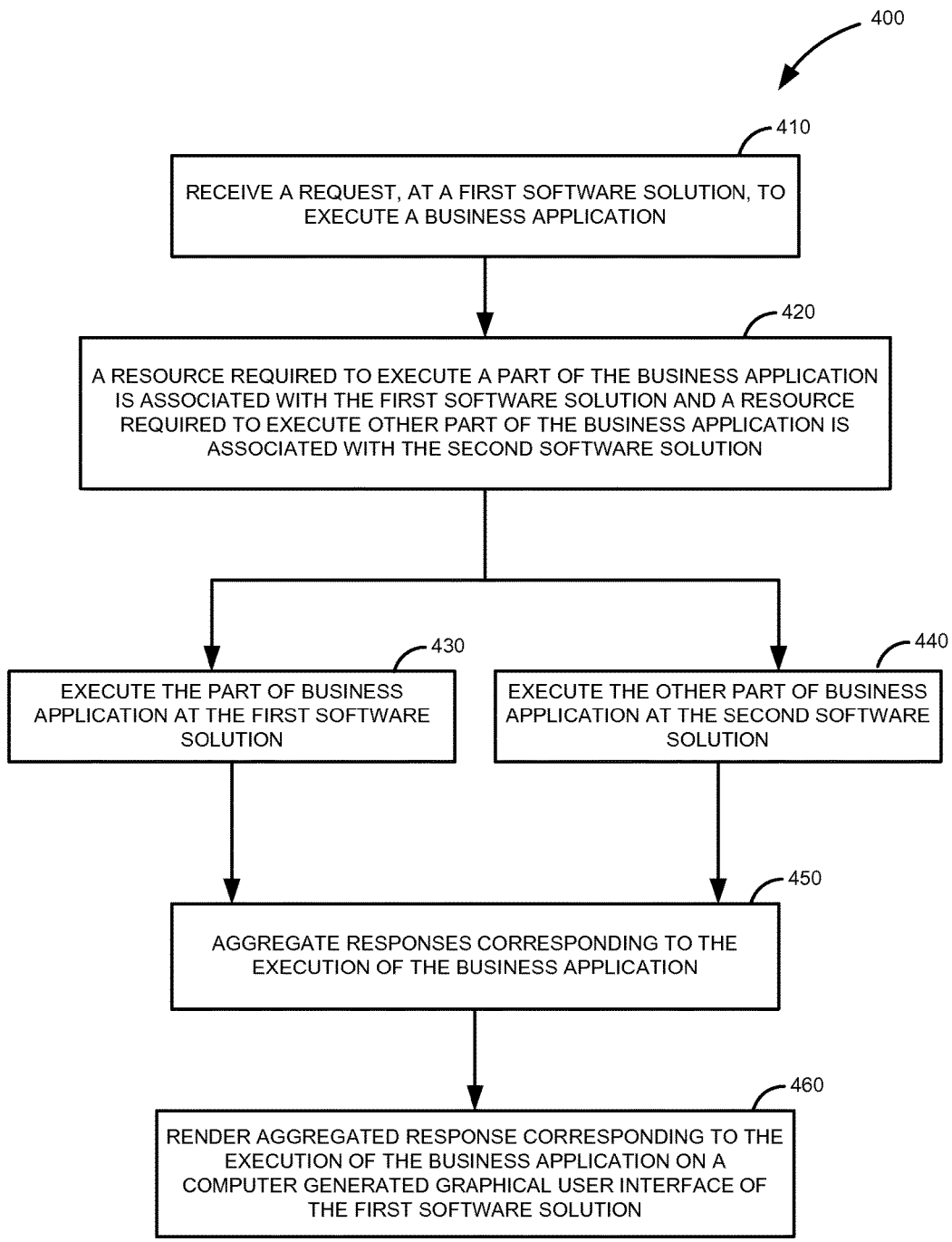
FIG. 4 is a flow diagram illustrating a process to integrate software solutions to execute business applications, according to an embodiment.

FIG. 4 is a flow diagram illustrating process 400 to integrate software solutions to execute business applications, according to an embodiment. At 410, a request is received at a first software solution to execute a business application. The business application includes at least one of an on-premise application and a cloud application. For example, the business applications can be enterprise resource planning (ERP), customer relationship management (CRM), supply chain management (SCM), supplier relationship management (SRM), and so on. Further, the first software solution can be an on-premise solution or an on-demand solution.

At 420, upon receiving the request to execute the business application, it is determined that a resource required to execute a part of the business application is associated with the first software solution and a resource required to execute other part of the business application is associated with the second software solution.

At 430, the part of the business application is executed at the first software solution when the resource required to execute the part of the business application is associated with the first software solution. At 440, the other part of the business application is executed at the second software solution when the resource required to execute the other part of the business application is associated with the second software solution by forwarding the request to the second software solution to execute the other part of the business application.

At 450, a response from the second software solution corresponding to the execution of the other part of the business application is received. Further, the received response and a response corresponding to the execution of the part of the business application at the first software solution are aggregated. At 460, the aggregated response is rendered on the computer generated user interface associated with the first software solution. In one embodiment, the resources associated with the first software solution and the second software solution are updated or synchronized based on the execution of the business application.

Figure 5A:
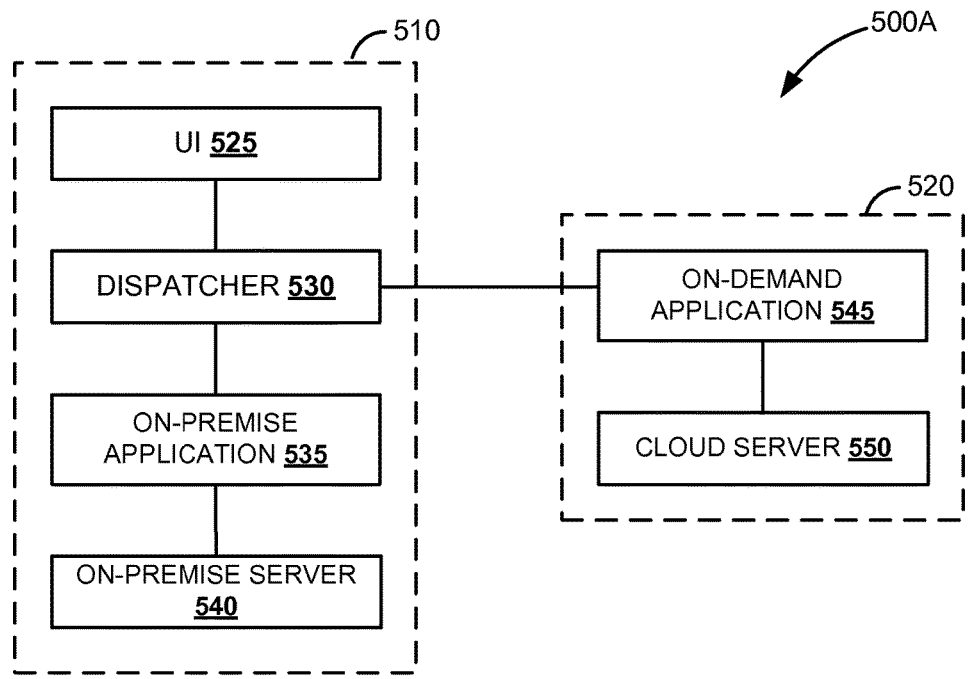
FIG. 5A is a block diagram illustrating a scenario of a process to integrate software solutions to execute business applications, according to an embodiment.

FIG. 5A is a block diagram illustrating a scenario of a process to integrate software solutions to execute business applications, according to an embodiment. In scenario 500A, a request is received at an on-premise solution 510 to execute a business application using a computer generated graphical user interface (UI) 525 of the on-premise solution 510. Further, it is determined that a resource required to execute a part of the business application is associated with the on-premise solution 510 and a resource required to execute other part of the business application is associated with the on-demand solution 520 by a dispatcher 530. Further, the part of the business application is executed using an on-premise application 535 and on-premise server 540. Another part of the business application is forwarded to the on-demand solution 520 to execute another part of the business application using an on-demand application 545 and a cloud sever 550. Further, a response from the on-demand solution 520 corresponding to the execution of the other part of the business application and a response corresponding to the execution of the part of the business application are aggregated. Then, the aggregated response is rendered on the computer generated user interface (e.g., 525) associated with the on-premise solution 510. Also, the on-premise server 540 and the cloud server 550 are updated based on the execution of the business application.

Figure 5B:
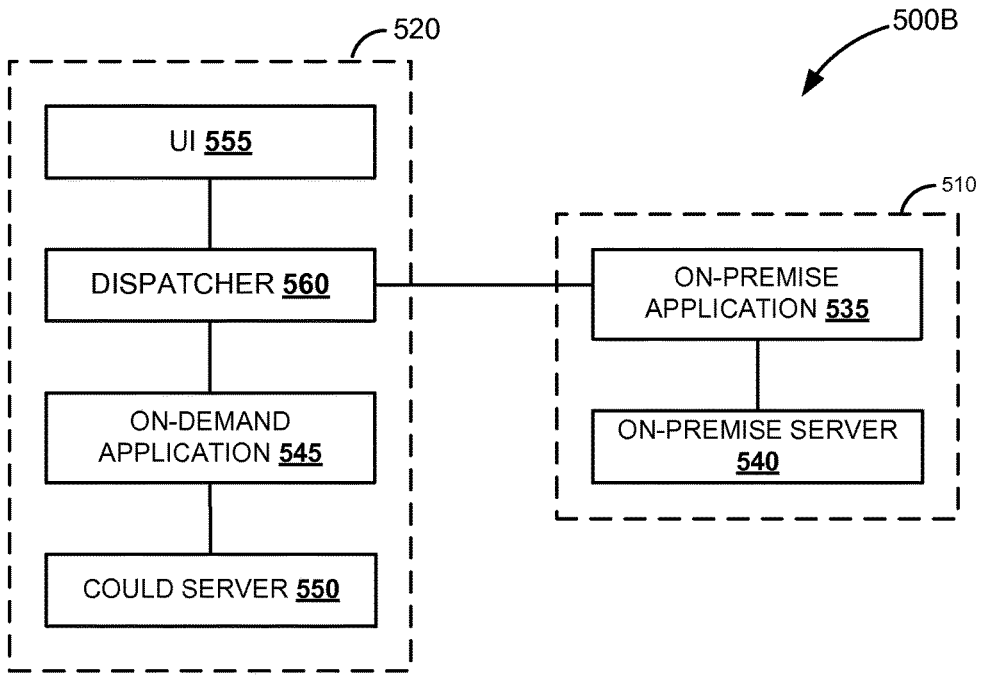
FIG. 5B is a block diagram illustrating a scenario of a process to integrate software solutions to execute business applications, according to an embodiment.

FIG. 5B is a block diagram illustrating a scenario of a process to integrate software solutions to execute business applications, according to an embodiment. In scenario 500B, a request is received at the on-demand solution 520 to execute a business application using a computer generated graphical user interface 555 of the on-demand solution 520. Further, a check is made to determine that a resource required to execute a part of the business application is associated with the on-demand solution 520 and a resource required to execute other part of the business application is associated with the on-premise solution 510 by a dispatcher 560. Further, the part of the business application is executed using an on-demand application 545 and the cloud server 550. The other part of the business application is forwarded to the on-premise solution 510 to execute the other part of the business application using an on-premise application 535 and the on-premise server 540. Further, a response from the on-premise solution 510 corresponding to the execution of the other part of the business application and a response corresponding to the executing of the part of business application in the on-demand solution 520 are aggregated. Then, the aggregated response is rendered on the computer generated user interface (UI) (e.g., 555) associated with the on-demand software solution 520. Also, the on-premise server 540 and the cloud server 550 are updated based on the execution of the business application.

Figure 6:
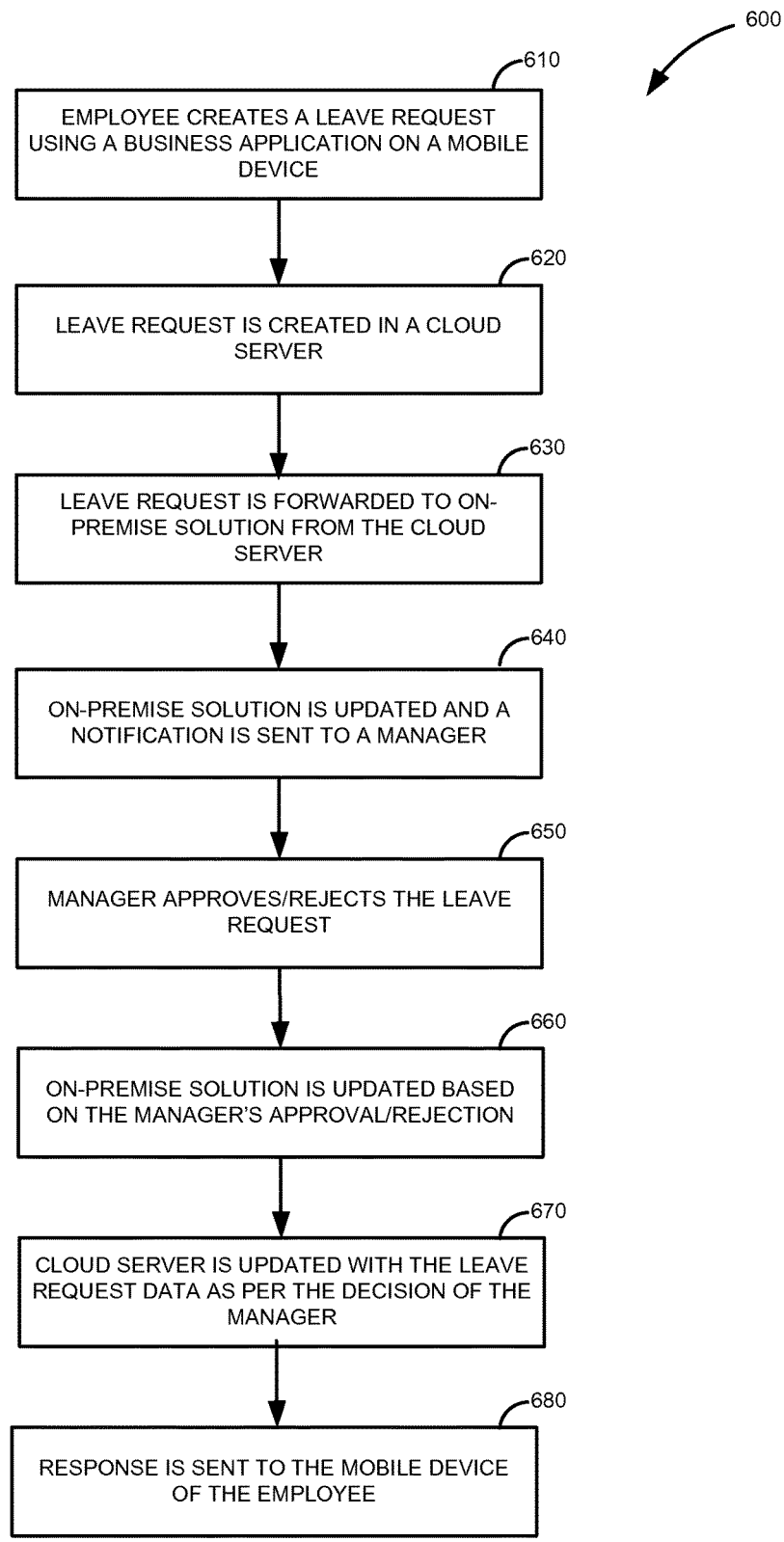
FIG. 6 is a flow diagram illustrating an exemplary process to execute a business application "creating a leave request," according to an embodiment.

FIG. 6 is a flow diagram illustrating exemplary process 600 to execute a business application "creating a leave request," according to an embodiment. A part of the business application "creating the leave request" such as "time data" is deployed in an on-premise solution and other data such as "personal information" and "organization management" are deployed in an on-demand solution (e.g., a cloud server). In the example, employee access the business application "creating the leave request" via a mobile phone (in other words, via on-demand solution).

At 610, the employee creates a leave request using a business application deployed on the mobile phone. Further, the leave request is created in the cloud server, at 620.

Further at 630, the leave request is forwarded to the on-premise solution since the part of the leave request application has to be executed in the on-premise solution. Thereby, the on-premise solution is updated with the created leave request and a notification stating the leave request of the employee is forwarded to a manager corresponding to the employee, at 640.

Upon receiving the notification at 650, the manager may approve or reject the leave request. According to the approval or rejection by the manager, the on-premise solution is updated, at 660. Further at 670, the cloud server is updated with the manager's decision. At 680, a response including the manager's decision (e.g., the leave request is approved or the leave request is rejected) is communicated to the employee via the mobile phone. Thereby, the employee or the user can access any business application via the on-premise solution or the on-demand solution, the business application is executed and the user will receive the response corresponding to the execution of the business application and thus the integration between the software solutions are achieved.

In another example, when the leave request application is available completely on the cloud server, the leave request application is executed and the employee is notified with a response associated with the execution of the leave request application directly without necessity of the synchronization or integration with the on-premise solution. Therefore, the user gets to see all his subscribed notifications without him realizing where his data is coming from because of the software solutions' integration. With this the data and the notifications to the users are simplified and also the data is integrated between the on premise server and the cloud server.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may correspond to a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
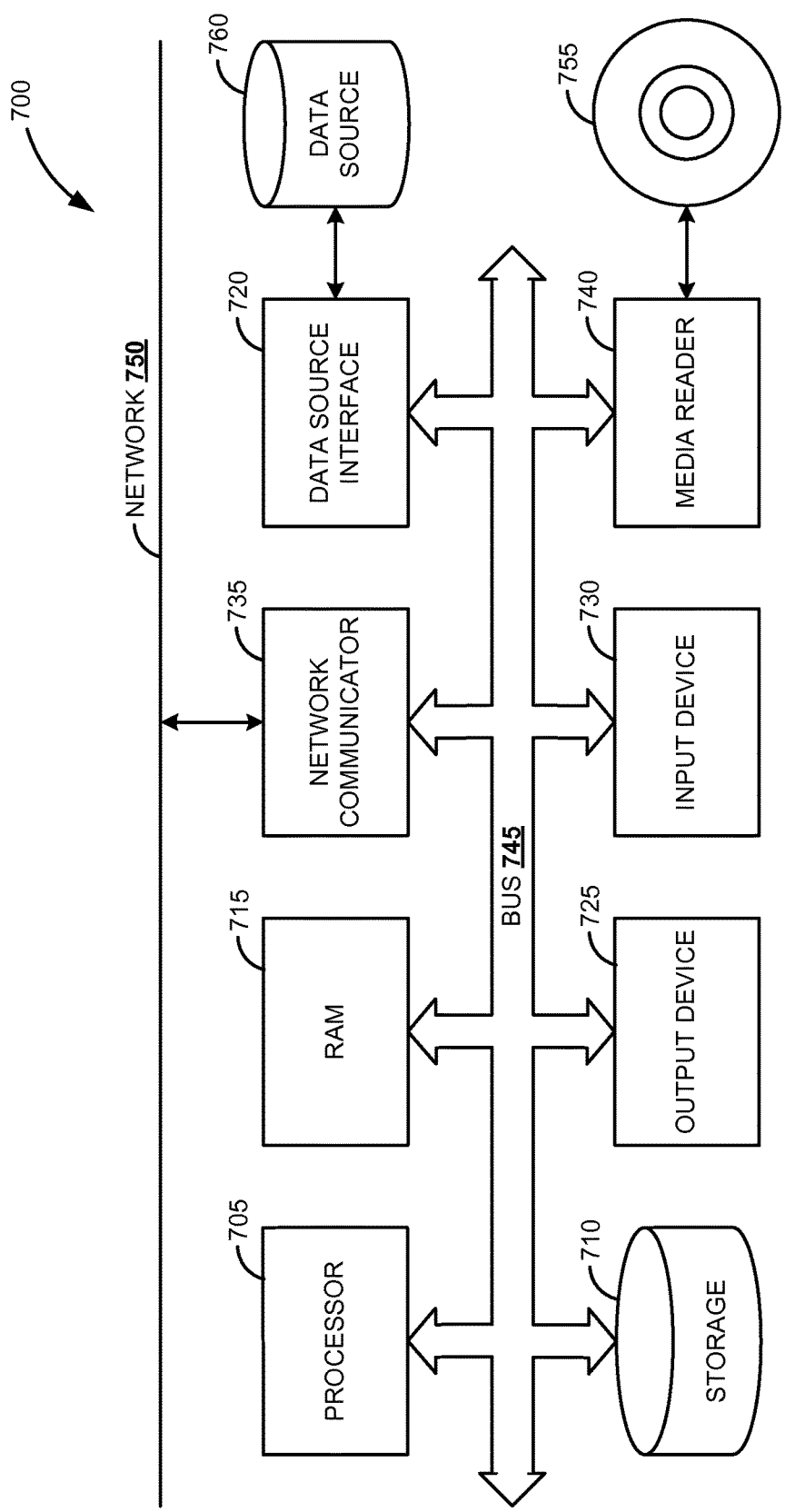
FIG. 7 is a block diagram of an exemplary computer system, according to an embodiment.

FIG. 7 is a block diagram of an exemplary computer system 700. The computer system 700 includes a processor 705 that executes software instructions or code stored on a computer readable storage medium 755 to perform the above-illustrated methods. The processor 705 can include a plurality of cores. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. According to some embodiments, such as some in-memory computing system embodiments, the RAM 715 can have sufficient storage capacity to store much of the data required for processing in the RAM 715 instead of in the storage 710. In some embodiments, all of the data required for processing may be stored in the RAM 715. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium storing instructions, which when executed by a computer cause the computer to perform operations comprising:
   receive a request, at an on-demand solution, to execute a business application;
   determine, by a dispatcher associated with the on-demand solution, whether resources required to execute the business application are associated with both the on-demand solution and an on-premise solution, associated only with the on-demand solution, or associated only with the on-premise solution;
   execute the business application based on the determination, comprising:
      when the resources required to execute the business application are associated with both the on-demand solution and the on-premise solution,
         execute a part of the business application at the on-demand solution,
         forward, by the dispatcher associated with the on-demand solution, a request to the on-premise solution to execute other part of the business application,
         receive a response from the on-premise solution corresponding to the execution of the other part of the business application, and
         aggregate, by the on-demand solution, the received response corresponding to the execution of the other part of the business application and a response corresponding to the execution of the part of the business application, the aggregated response corresponds to the execution of the business application;
      when the resources required to execute the business application are only associated with the on-demand solution,
         execute the business application at the on-demand solution;
      when the resources required to execute the business application are only associated with the on-premise solution,
         forward the request to the on-premise solution to execute the business application, and
         receive a response from the on-premise solution corresponding to the execution of the business application; and
   forward, by the on-demand solution, the response corresponding to the execution of the business application for display on a computer generated user interface.

2. The non-transitory computer-readable medium of claim 1, further comprising instructions, which when executed cause the computer to: update resources associated with the on-demand solution and the on-premise solution based on the execution of the business application.

3. The non-transitory computer-readable medium of claim 1, wherein the business application comprises at least one of an on-premise application and an on-demand application.

4. The non-transitory computer-readable medium of claim 1, further comprising instructions, which when executed cause the computer to establish a secure communication channel between the on-demand solution and the on-premise solution to forward the request and to receive the response.

5. A computer implemented method to integrate software solutions to execute business applications, the method comprising:
   receiving a request, at an on-demand solution, to execute a business application;
   determining, by a dispatcher associated with the on-demand solution, whether resources required to execute the business application are associated with both the on-demand solution and an on-premise solution, associated only with the on-demand solution, or associated only with the on-premise solution;
   executing the business application based on the determination, comprising:
      when the resources required to execute the business application are associated with both the on-demand solution and the on-premise solution,
         executing a part of the business application at the on-demand solution,
         forwarding, by the dispatcher associated with the on-demand solution, a request to the on-premise solution to execute other part of the business application,
         receiving a response from the on-premise solution corresponding to the execution of the other part of the business application, and
         aggregating, by the on-demand solution, the received response corresponding to the execution of the other part of the business application and a response corresponding to the execution of the part of the business application, the aggregated response corresponds to the execution of the business application;
      when the resources required to execute the business application are only associated with the on-demand solution,
         execute the business application at the on-demand solution;
      when the resources required to execute the business application are only associated with the on-premise solution,
         forward the request to the on-premise solution to execute the business application, and
         receive a response from the on-premise solution corresponding to the execution of the business application;
   rendering, by the on-demand solution, the response corresponding to the execution of the business application for display on a computer generated user interface.

6. The computer implemented method of claim 5, further comprising: updating resources associated with the on-demand solution and the on-premise solution based on the execution of the business application.

7. The computer implemented method of claim 5, wherein the business application comprises at least one of an on-premise application and an on-demand application.

8. The computer implemented method of claim 5, further comprising: establishing a secure communication channel between the on-demand solution and the on-premise solution to forward the request and to receive the response.

9. A computer system to integrate software solutions to execute business applications, the computer system comprising:
   at least one processor; and
   one or more memory devices communicative with the at least one processor, wherein the one or more memory devices store instructions to:
      receive a request, at an on-demand solution, to execute a business application;
      determine, by a dispatcher associated with the on-demand solution, whether resources required to execute the business application is associated with both the on-demand solution and an on-premise solution, associated only with the on-demand solution, or associated only with the on-premise solution;
execute the business application based on the determination, comprising:
when the resources required to execute the business application are associated with both the on-demand solution and the on-premise solution,
execute a part of the business application at the on-demand solution,
forward, by the dispatcher associated with the on-demand solution, a request to the on-premise solution to execute other part of the business application,
receive a response from the on-premise solution corresponding to the execution of the other part of the business application, and
aggregate, by the on-demand solution, the received response corresponding to the execution of the other part of the business application and a response corresponding to the execution of the part of the business application, the aggregated response corresponds to the execution of the business application;
when the resources required to execute the business application are only associated with the on-demand solution,
execute the business application at the on-demand solution;
when the resources required to execute the business application are only associated with the on-premise solution,
forward the request to the on-premise solution to execute the business application, and
receive a response from the on-premise solution corresponding to the execution of the business application; and
forward, by the on-demand solution, the response corresponding to the execution of business application for display on a computer generated user interface associated with the on-demand-solution.

10. The computer system of claim 9, further comprising instructions to: update resources associated with the on-demand solution and the on-premise solution based on the execution of the business application.

11. The computer system of claim 9, further comprising instructions to: establish a secure communication channel between the on-demand solution and the on-premise solution to forward the request and to receive the response.

12. A computer implemented method to integrate software solutions to execute business applications, the method comprising:
receiving a request, at an on-premise solution, to execute a business application;
determining, by a dispatcher, whether resources required to execute the business application are associated with both the on-premise solution and an on-demand solution, associated only with the on-premise solution, or associated only with the on-demand solution;
executing the business application based on the determination, comprising:
when the resources required to execute the business application are associated with both the on-premise solution and the on-demand solution,
executing a part of the business application at the on-premise solution,
forwarding, by the dispatcher, a request to the on-demand solution to execute other part of the business application,
receiving a response from the on-demand solution corresponding to the execution of the other part of the business application, and
aggregating, by the on-premise solution, the received response corresponding to the execution of the other part of the business application and a response corresponding to the execution of the part of the business application;
when the resources required to execute the business application are only associated with the on-premise solution,
execute the business application at the on-premise solution;
when the resources required to execute the business application are only associated with the on-demand solution,
forward the request to the on-demand solution to execute the business application, and
receive a response from the on-demand solution corresponding to the execution of the business application; and
forwarding, by the on-premise solution, the response corresponding to the execution of the business application for display on a computer generated user interface.

* * * * *